(12) United States Patent
Yuyama (10) Patent No.: US 10,658,700 B2
(45) Date of Patent: May 19, 2020

(54) ADDITIVE FOR ELECTROLYTE SOLUTIONS

(71) Applicant: Nisshinbo Holdings Inc., Tokyo (JP)

(72) Inventor: Kanako Yuyama, Chiba (JP)

(73) Assignee: Nisshinbo Holdings Inc., Tokyo (JP)

( * ) Notice: Subject to any disclaimer, the term of this patent is extended or adjusted under 35 U.S.C. 154(b) by 25 days.

(21) Appl. No.: 15/761,201

(22) PCT Filed: Jul. 6, 2016

(86) PCT No.: PCT/JP2016/070012
§ 371 (c)(1),
(2) Date: Mar. 19, 2018

(87) PCT Pub. No.: WO2017/051587
PCT Pub. Date: Mar. 30, 2017

(65) Prior Publication Data
US 2018/0269529 A1    Sep. 20, 2018

(30) Foreign Application Priority Data

Sep. 25, 2015   (JP) .................................. 2015-187773

(51) Int. Cl.
*H01M 10/0525*    (2010.01)
*H01M 10/0567*    (2010.01)
(Continued)

(52) U.S. Cl.
CPC ........ *H01M 10/0567* (2013.01); *H01G 11/60* (2013.01); *H01G 11/64* (2013.01);
(Continued)

(58) Field of Classification Search
CPC ......... H01M 10/0525; H01M 10/0567; H01M 10/0569; H01M 12/06; H01M 12/08;
(Continued)

(56) References Cited

U.S. PATENT DOCUMENTS

| 3,141,898 A | 7/1964 | Tiers |
| 6,900,257 B2 * | 5/2005 | Chowdhury .......... C07C 211/63 524/186 |

(Continued)

FOREIGN PATENT DOCUMENTS

| JP | 2000-123867 A | 4/2000 |
| JP | 2002-359001 A | 12/2002 |

(Continued)

OTHER PUBLICATIONS

International Search Report dated Aug. 16, 2016, issued in counterpart International Application No. PCT/JP2016/070012 (2 pages).

*Primary Examiner* — Brittany L Raymond
(74) *Attorney, Agent, or Firm* — Westerman, Hattori, Daniels & Adrian, LLP (57) ABSTRACT

The withstand voltage of an electrolyte solution is able to be increased by adding an additive for electrolyte solutions, which is composed of a compound that is configured from a silicon-containing sulfonate anion represented by formula (1) and a cation of, for example, a quaternary ammonium salt or a quaternary phosphonium salt, into the electrolyte solution.

$$\mathrm{^-O_3S{-}(CH_2)}_n{-}\underset{\underset{R}{|}}{\overset{\overset{R}{|}}{Si}}{-}R \qquad (1)$$

In the formula, each R independently represents an alkyl group having 1-8 carbon atoms; and n represents an integer of 2-6.

11 Claims, 4 Drawing Sheets

(51) Int. Cl.
    *H01M 10/0569* (2010.01)
    *H01M 12/08* (2006.01)
    *H01G 11/60* (2013.01)
    *H01G 11/64* (2013.01)
    *H01G 11/84* (2013.01)
    *H01M 12/06* (2006.01)

(52) U.S. Cl.
    CPC ... *H01M 10/0525* (2013.01); *H01M 10/0569* (2013.01); *H01M 12/06* (2013.01); *H01M 12/08* (2013.01); *H01G 11/84* (2013.01); *H01M 2300/0037* (2013.01); *Y02E 60/128* (2013.01); *Y02E 60/13* (2013.01)

(58) Field of Classification Search
    CPC ........... H01M 2300/0037; H01G 11/60; H01G 11/64; H01G 11/84; Y02E 60/128; Y02E 60/13
    See application file for complete search history.

(56) References Cited

U.S. PATENT DOCUMENTS

| | | |
|---|---|---|
| 2002/0197537 A1 | 12/2002 | Kim et al. |
| 2004/0030015 A1 | 2/2004 | Chowdhury et al. |
| 2015/0203518 A1 | 7/2015 | Masuda |
| 2015/0291633 A1* | 10/2015 | Masuda ................ H01G 11/62 361/502 |

FOREIGN PATENT DOCUMENTS

| | | | |
|---|---|---|---|
| JP | 2005-535690 A | | 11/2005 |
| JP | 2007-165125 A | | 6/2007 |
| JP | 2010-205870 A | | 9/2010 |
| JP | 2012-38900 A | | 2/2012 |
| WO | 2009/020038 A1 | | 2/2009 |
| WO | 2013/005712 A1 | | 1/2013 |
| WO | 2014/061484 A1 | | 4/2014 |
| WO | WO 2014-061484 | * | 4/2014 |

* cited by examiner

ADDITIVE FOR ELECTROLYTE SOLUTIONS

TECHNICAL FIELD

The present invention relates to an additive for electrolyte solutions, and more specifically relates to an additive for electrolyte solutions including a compound having a silicon-containing sulfonate anion.

BACKGROUND ART

In recent years, a portable electronic device such as a digital camera, a smart phone, or a tablet device has become remarkably popular. Along with this, demand for an electric storage device such as a secondary battery that can be repeatedly used by charging and is used as a power source for these devices is largely increasing, and demands for higher capacity and higher energy density of the electric storage device are further increasing.

In these electric storage devices, in general, a solution in which an ionic conductive salt is dissolved in an aprotic organic solvent is used as an electrolyte solution.

By the way, in an electric storage device aiming for high-voltage operation, a withstand voltage of an electrolyte solution is a factor determining an upper limit potential of the device. Under a high voltage, an organic solvent and an ionic conductive salt constituting the electrolyte solution are exposed to a high voltage and may be electrically decomposed on a surface of an electrode. An electrolyte solution having a better withstand voltage property is required.

As a technique for improving the withstand voltage of an electrolyte solution, a method for adding various additives to the electrolyte solution has been reported (for example, refer to Patent Documents 1 to 4). However, there is room for further improvement from viewpoints of au effect of improving a withstand voltage and suppression of an increase in internal resistance.

It is known that an ionic liquid has a high withstand voltage. However, the ionic liquid has a problem in terms of ionic conductivity in a range of a low temperature to a normal temperature as compared with a general organic solvent, and is unsuitable for a device operating at a low temperature and a high voltage.

PRIOR ART DOCUMENTS

Patent Documents

Patent Document 1: JP-A 2000-123867
Patent Document 2: JP-A 7007-165175
Patent Document 3: JP-A 2010-205870
Patent Document 4: JP-A 2012-038900

SUMMARY OF INVENTION

Technical Problem

The present invention has been achieved in view of such circumstances, and an object thereof is to provide a novel additive for electrolyte solutions capable of improving a withstand voltage of an electrolyte solution.

Solution to Problem

As a result of intensive studies to achieve the above-described object, the present inventor has found that by adding a compound having a silicon-containing sulfonate anion to an existing electrolyte solution, the withstand voltage of the electrolyte solution improves, and that an electric storage device such as a secondary battery or a capacitor having excellent lifetime performance can be obtained by using an electrolyte solution containing this additive, thus completing the present invention.

That is, the present invention provides:

1. an additive for electrolyte solutions including a compound constituted by a silicon-containing sulfonate anion represented by formula (1) and a monovalent or polyvalent cation:

[Chem. 1]

wherein Rs each independently represent an alkyl group having 1 to 8 carbon atoms, and n represents an integer of 2 to 6;

2. the additive for electrolyte solutions according to 1 above, wherein all the Rs are methyl groups;

3. the additive for electrolyte solutions according to 1 or 2 above, wherein the cation is at least one monovalent cation selected from the group consisting of an alkali metal ion, a quaternary ammonium ion, an imidazolium ion, and a quaternary phosphonium ion;

4. the additive for electrolyte solutions according to 3 above, wherein the alkali metal ion is a sodium ion;

5. the additive for electrolyte solutions according to 3 above, wherein the quaternary ammonium ion is represented by formula

[Chem. 2]

wherein $R^1$ represents an alkyl group having 1 to 3 carbon atoms, $R^2$ represents a methyl group or an ethyl group, and in represents an integer of 1 or 2;

6. the additive for electrolyte solutions according to 3 above, wherein the imidazolium ion is represented by formula (3):

[Chem. 3]

wherein $R^3$ and $R^4$ each independently represent an alkyl group having 1 to 8 carbon atoms;

7. the additive for electrolyte solutions according to 3 above, wherein the quaternary phosphonium ion is represented by formula (4):

[Chem. 4]

(4)

wherein $R^5$ represents an alkyl group having 1 to 30 carbon atoms, and $R^6$ represents an alkyl group or an alkoxy group having 1 to 30 carbon atoms;
8. an electrolyte solution containing the additive for electrolyte solutions according to any one of 1 to 7 above, an organic solvent, and an electrolyte salt;
9. the electrolyte solution according to 8 above, wherein the organic solvent is a carbonates solvent;
10. the electrolyte solution according to 9 above, wherein the carbonates solvent is a mixed solvent;
11. an electric storage device constituted by using the electrolyte solution according to any one of 8 to 10 above;
12. an electric storage device constituted by using the additive for electrolyte solutions according to any one of 1 to 7 above;
13. the electric storage device according to 11 or 12 above, which is a secondary battery or an electric double layer capacitor; and
14. a method for adding the additive for electrolyte solutions according to any one of 1 to 7 above to an electrolyte solution containing a solvent and an electrolyte salt to improve a withstand voltage of the electrolyte solution.

Advantageous Effects of Invention

By adding a compound constituted by a silicon-containing sulfonate anion and a monovalent cation according to the present invention to an existing electrolyte solution, a withstand voltage of the electrolyte solution can be improved.

In an electric storage device including the electrolyte solution containing the additive, an operation upper limit voltage is increased, a voltage and a capacity density are increased, and the degree of deterioration caused by repeated charge/discharge is suppressed.

DESCRIPTION OF EMBODIMENTS

Hereinafter, the present invention is described in more detail.

An additive for electrolyte solutions according to the present invention includes a compound constituted by a silicon-containing sulfonate anion represented by formula (1) and a monovalent or polyvalent cation.

[Chem. 5]

(1)

In formula (1), Rs each independently represent an alkyl group having 1 to 8 carbon atoms.

The alkyl group having 1 to 8 carbon atoms may be linear, branched, or cyclic, and examples thereof include methyl, ethyl, n-propyl, i-propyl c-propyl, n-butyl, i-butyl, s-butyl, t-butyl, c-butyl, n-pentyl, c-pentyl, n-hexyl, c-hexyl, n-heptyl, n-octyl, and 2-ethylhexyl groups.

Among these groups, R is preferably an alkyl group having 1 to 4 carbon atoms, more preferably an alkyl group having 1 to 3 carbon atoms, and most preferably a methyl group.

n represents an integer of 2 to 6, and is preferably 2 or 3, and more preferably 3 from a viewpoint of further improving a withstand voltage of an electrolyte solution.

The additive for electrolyte solutions of the present invention is characterized by having the above-described anion. Therefore, a cation serving as a counter ion thereof is not particularly limited, and can be appropriately selected for use from various known cations. The valence thereof is not particularly limited. A monovalent cation or a polyvalent cation having a valence of two or more may be used, but a monovalent cation is preferably used in the present invention.

Specific examples thereof include an alkali metal ion such as lithium, sodium, potassium, rubidium, or cesium, a quaternary ammonium ion, a quaternary phosphonium ion, an imidazolium ion, and a pyridinium ion. However, the alkali metal ion, the quaternary ammonium Ion, the quaternary phosphonium ion, and the imidazolium ion are preferable.

Note that a phosphorous-based cation such as quaternary phosphonium on is preferable from a viewpoint of improving flame retardancy.

As the alkali metal ion, sodium ion is preferable.

Examples of the quaternary ammonium ion include a tetraalkylammonium ion and a tetraalkylammonium ion having an alkoxy group-substituted alkyl group. However, in the present invention, a pyrrolidinium ion having an alkyl group and an alkoxy-substituted alkyl group on a nitrogen atom is preferable, and a pyrrolidinium ion represented by formula (2) is more preferable.

[Chem. 6]

(2)

In formula (2), $R^1$ represents an alkyl group having 1 to 3 carbon atoms, $R^2$ represents a methyl group or an ethyl group, and m represents an integer of 1 or 2.

Examples of the alkyl pimp having 1 to 3 carbon atoms include methyl, ethyl, and n-propyl groups. However, the methyl group is particularly preferable.

Examples of the imidazolium ion include a 1-alkyl-3-alkylimidazolium ion. However, in the present invention, an imidazolium ion represented by formula (3) is preferable.

[Chem. 7]

(3)

In formula (3), $R^3$ and $R^4$ each independently represent an alkyl group having 1 to 8 carbon atoms, preferably an alkyl group having 1 to 4 carbon atoms, and more preferably a methyl or ethyl group.

Examples of the alkyl group having 1 to 8 carbon atoms include similar ones to the groups described above.

Examples of the quaternary phosphonium ion include a tetraalkylphosphonium ion and a trialkylalkoxyphosphonium ion. However, in the present invention, a phosphonium ion represented by formula (4) is preferable.

[Chem. 8]

(4)

In formula (4), $R^5$ represents an alkyl group having 1 to 30 carbon atoms, and $R^6$ represents an alkyl group or an alkoxy group having 1 to 30 carbon atoms.

The alkyl group having 1 to 30 carbon atoms may be linear, branched, or cyclic, and examples thereof include methyl, ethyl, n-propyl, i-propyl, c-propyl, n-butyl, s-butyl, t-butyl, c-butyl, n-pentyl, c-pentyl, n-hexyl, c-hexyl, n-heptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-eicosyl groups.

The alkoxy group having 1 to 30 carbon atoms may have a linear, branched, or cyclic alkyl group, and examples thereof include methoxy, ethoxy, n-propoxy, c-propoxy, n-butoxy, i-butoxy, s-butoxy, c-butoxy, n-pentyloxy, c-pentyloxy n-hexyloxy c-hexyloxy, n-heptyloxy, n-octyloxy 2-ethylhexyloxy, n-nonyloxy, n-decyloxy, n-undecyloxy, n-dodecyloxy, n-tridecyloxy, n-tetradecyloxy, n-pentadecyloxy, n-hexadecyloxy, n-heptadecyloxy, n-octadecyloxy, n-nonadecyloxy, and n-eicosyloxy groups.

Among these groups, as $R^5$, a linear alkyl group having 2 to 8 carbon atoms is preferable, a linear alkyl group having 2 to 5 carbon atoms is more preferable, a linear alkyl group having 2 to 4 carbon atoms is still more preferable, and an n-butyl group is most preferable.

As $R^6$, a linear alkyl group having 10 to 20 carbon atoms is preferable, and a linear alkyl group having 12 to 20 carbon atoms is more preferable.

Compounds constituted by the above-described various silicon-containing sulfonate anions and monovalent cations can be synthesized by a known method, and some of the compounds can also be obtained as commercially available products.

For example, sodium 3-(trimethylsilyl)-1-propanesulfonate is commercially available from Tokyo Chemical Industry Co., Ltd. and Aldrich Corporation.

Specific examples of a synthesis method thereof include a manufacturing method in which a trialkylsilyl group-containing alkylsulfonate and a halide salt of a desired cation (for example, tetraalkylphosphonium halide, tetraalkylammonium halide, or 1,3-dialkylimidazolium halide) are caused to react with each other in a solvent, and a neutralization method in which a trialkylsilyl group-containing alkylsulfonate and the above-described halide salt are converted into a trialkylsilyl group-containing alkylsulfonic acid and a hydroxide of a desired cation using a cation-exchange resin and an anion-exchange resin, respectively, and then the resulting products are mixed.

In this case, as the sulfonate, a sodium salt, a potassium salt, a silver salt, and the like can be used.

Examples of the halogen atom include fluorine, chlorine, bromine, and iodine atoms, but a chlorine atom and a bromine atom are preferable.

As the solvent, either water or an organic solvent may be used.

The additive for electrolyte solutions of the present invention is added to an electrolyte solution containing a solvent and an electrolyte salt to be used.

The solvent can be appropriately selected for use from various solvents conventionally used as a solvent for electrolyte solutions. Specific examples thereof include water and an organic solvent including: alcohols such as methanol or ethanol; chain ethers such as dibutyl ether, 1,2-dimethoxyethane, 1,2-ethoxymethoxyethane methyl diglyme, methyl triglyme, methyl tetraglyme, ethyl glyme, ethyl diglyme, butyl diglyme, ethyl cellosolve, ethyl carbitol, butyl cellosolve, or butyl carbitol; heterocyclic ethers such as tetrahydrofuran, 2-methyltetrahydrofuran, 1,3-dioxolane, or 4,4-dimethyl-1,3-dioxane; lactones such as γ-butyrolactone γ-valerolactone, δ-valerolactone, 3-methyl-1,3-oxazolidin-2-one, or 3-ethyl-1,3-oxazolidin-2-one; amides such as N-methylformamide, N,N-dimethylformamide, N-methylacetamide, or N-methylpyrrolidinone; carbonates such as diethyl carbonate, dimethyl carbonate, ethyl methyl carbonate, propylene carbonate, ethylene carbonate, or butylene carbonate; imidazolines such as 1,3-dimethyl-2-imidazolidinone; and nitrites such as acetonitrile or propionitrile. These solvents can be used singly or in mixture of two or more kinds thereof.

Among these solvents, an organic solvent is preferable, a carbonates solvent is more preferable, and a mixed solvent of two or more carbonates is still more preferable.

Meanwhile, the electrolyte salt is appropriately selected according to the kind of an electric storage device. Specific examples thereof include: a lithium salt such as lithium tetrafluoroborate, lithium hexafluorophosphate, lithium bis(trifluoromethanesulfonyl) amide, lithium bis(fluorosulfonyl) amide, lithium perchlorate lithium acetate, lithium trifluoroacetate, lithium benzoate, lithium p-toluenesulfonate, lithium nitrate, lithium bromide, or lithium iodide; a quaternary ammonium salt such as tetraethylammonium hexafluorophosphate, tetraethylammonium hexafluorophosphate, tetrapropylammonium hexafluorophosphate, methyltriethylammonium hexafluorophosphate tetraethylammonium tetrafluoroborate, or tetraethylammonium perchlorate; lithium bis(trifluoromethanesulfonyl) imide; and lithium bis(fluorosulfonyl) imide.

The concentration of an electrolyte salt in an electrolyte solution is not particularly limited, and is usually about 0.5 to 3 mol/L, preferably about 0.8 to 2 mol/L, and more preferably about 0.9 to 1.5 mol/L.

The addition amount of the additive for electrolyte solutions of the present invention in an electrolyte solution is not particularly limited as long as a withstand voltage improvement effect is exerted. However, the addition amount is preferably 0.05% by mass or more, more preferably 0.1% by weight or more, still more preferably 0.5% by weight or more, and further still more preferably 0.7% by weight or more in the entire electrolyte solution (100% by weight) considering efficiently exerting the withstand voltage improvement effect.

An upper limit thereof is not particularly limited, but is preferably 10% by weight, more preferably 8% by weight, and still more preferably 6% by weight considering suppressing an increase in internal resistance of a device.

An electric storage device in the present invention is not particularly limited, and examples thereof include various electric storage devices such as an electric double layer capacitor, a lithium ion capacitor, a redox capacitor, a lithium secondary battery, a lithium ion secondary battery, a lithium air battery, and a proton polymer battery.

The electric storage device in the present invention is not particularly limited as long as including an electrolyte solution containing the above-described additive for electrolyte solutions. Examples thereof include: a general secondary battery including a positive electrode including a positive electrode current collector and a positive electrode active material layer formed on a surface of the positive electrode current collector, a negative electrode including a negative electrode current collector and a negative electrode active material layer formed on a surface of the negative electrode current collector, and a separator interposed between these electrodes; an air battery including a positive electrode (air electrode) layer, a negative electrode layer, and an electrolyte solution layer disposed between these electrodes, obtained by applying an electrolyte solution containing the additive for electrolyte solutions of the present invention; and an electric double layer capacitor including a pair of polarizable electrodes, a separator interposed between these electrodes, and an electrolyte solution, obtained by applying an electrolyte solution containing the additive for electrolyte solutions of the present invention.

Materials constituting the above-described secondary battery may be appropriately selected for use from conventionally known materials, and are not particularly limited, but examples thereof are as follows.

Specific examples of the positive electrode current collector include an aluminum foil and an aluminum alloy foil. A three-dimensional porous body thereof such as a foam or a nonwoven fabric can also be used as the current collector.

Specific examples of the positive electrode active material include a carbonaceous material capable of reversibly supporting lithium, such as activated carbon or carbon nanotube and a lithium oxide having an olivine type crystal structure, a layered rock salt type crystal structure, or a spinel type crystal structure. Examples of the activated carbon raw material include coconut husk, a phenol resin, and petroleum coke. Examples of a method for activating the activated carbon raw material include a steam activation method and a molten alkali activation method. Examples of the lithium oxide include a composite oxide represented by a general formula $LiMPO_4$ (M represents one or more of Fe(II), Mn(II), Co(II), and Ni(II)), lithium cobaltite ($LiCoO_2$), $LiNiO_2$, $LiNiO_2$, $LiMnO_3$, and a NiCo-based compound such as $LiNi_{0.8}Co_{0.2}O_2$.

Specific examples of the negative electrode current collector include a copper foil, a copper alloy foil, a nickel foil, a nickel alloy foil, a stainless steel foil, an aluminum foil, and an aluminum alloy foil.

Specific examples of the negative electrode active material are not particularly limited as long as being able to occlude/release lithium ions, but include a carbonaceous material (graphite or the like), a silicon oxide, a silicon alloy, a tin oxide, a tin alloy, lithium simple substance, and a metal capable of forming a lithium alloy, such as aluminum, lead, tin, indium, bismuth, silver, barium, calcium, mercury, palladium, platinum, tellurium, zinc, or lanthanum. These materials may be used singly or in combination of two or more kinds thereof. A carbonaceous material or a lithium composite oxide is preferable from a viewpoint of safety. Furthermore, a material containing titanium (Ti), lithium (Li), or both Ti and Li (for example, lithium titanate) is preferable from a viewpoint of high current density charge/discharge characteristics.

In addition, the above-described positive electrode active material and negative electrode active material may be used together with a conductive material.

Examples of the conductive material include carbon black, Ketjen black, acetylene black, carbon whisker, carbon fiber, natural graphite, artificial graphite, titanium oxide, ruthenium oxide, aluminum, and nickel.

The positive electrode and negative electrode active material layers can be formed by applying an electrode slurry containing the above-described active material, a binder polymer, and, as necessary, a conductive material and a solvent, onto a current collector, and drying the slurry under heating as necessary.

The binder polymer can be appropriately selected for use from known materials. Examples thereof include polyvinylidene fluoride (pVdF), polyvinyl pyrrolidone, polytetrafluoroethylene, tetrafluoroethylene-hexafluoropropylene copolymer, a vinylidene fluoride-hexafluoropropylene copolymer [P(VDF-HFP)], a vinylidene fluoride-trifluoroethylene chloride copolymer [P(VDF-CTFE)], polyvinyl alcohol, an ethylene-propylene-diene terpolymer, a styrene-butadiene rubber, and carboxymethyl cellulose (CMC).

A solvent is selected according to the type of a binder polymer, but in general, N-methyl-2-pyrrolidone or water is used.

Note that an electrode on which an active material layer is formed may be pressed as necessary.

Specific examples of the separator include a polyolefin-based separator such as polyethylene or polypropylene, a polyester-based separator such as polyethylene terephthalate, a polyamide-based separator, a polyimide-based separator, a cellulose-based separator, and a glass fiber-based separator.

In addition, materials constituting the above-described electric double layer capacitor may be appropriately selected for use from conventionally known materials, and are not particularly limited, but examples thereof are as follows.

Examples of a general polarizable electrode include an electrode obtained by applying a composition containing a carbonaceous material, a binder polymer, and, if necessary, a conductive material onto a current collector.

The carbonaceous material is not particularly limited, and examples thereof include conventionally known various carbonaceous materials, such as activated carbon, graphite, graphene, carbon nanotube, carbon nanofiber, and carbon nanohorn.

Specific examples of the positive electrode current collector include an aluminum foil and an aluminum alloy foil.

Specific examples of the negative electrode current collector include a copper foil, a copper alloy foil, a nickel foil, a nickel alloy foil, and a stainless steel foil.

In addition, examples of the binder polymer and the conductive material include similar materials to those exemplified for the secondary battery.

A solvent may be used at the time of preparation of the above-described composition. This solvent is selected according to the kind of a binder polymer. However, also in this case, N-methyl-2-pyrrolidone or water is preferable.

Specific examples of the separator include similar materials to those exemplified for the secondary battery.

The electric storage device in the present invention can be obtained, for example, by laminating, folding, or winding a device structure in which a separator is interposed between a pair of electrodes, forming the device structure into a coin type or the like as necessary, putting the device structure in a battery container such as a battery can or a laminate pack, then filling the battery container with an electrolyte solution containing the additive for electrolyte solutions of the present invention, and sealing the resulting product in a case of a battery can or heat sealing (thermally welding) the resulting product in a case of a laminate pack.

EXAMPLES

Hereinafter, the present invention is described more specifically with reference to Examples and Comparative Examples, but the present invention is not limited to the following Examples. Analyzers and conditions used are as follows.

[1] $^1$H-NMR spectrum
  Apparatus: AL-400 manufactured by JEOL Ltd.
[2] Cyclic voltammetry
  Apparatus: electrochemical measuring apparatus HSV-100 manufactured by Hokuto Denko Corporation
  Constant temperature thermostatic chamber: ESPEC CORPORATION SU-241
  Measurement conditions: Under a dry environment, measurement was performed at a temperature of 25° C. at a sweep rate of 5 mV/sec using a glassy carbon electrode as a working electrode, a platinum electrode as a counter electrode, and an Ag/Ag$^+$ type or Ag/AgCl electrode as a reference electrode.
[3] Internal resistance
  Apparatus: resistance meter RM 3548 manufactured by Hioki Electric Co., Ltd.
[1] Synthesis of additive for electrolyte solutions Synthesis Example 1

Synthesis of Compound 3

[Chem. 9]

Compound 3

Figure 1:
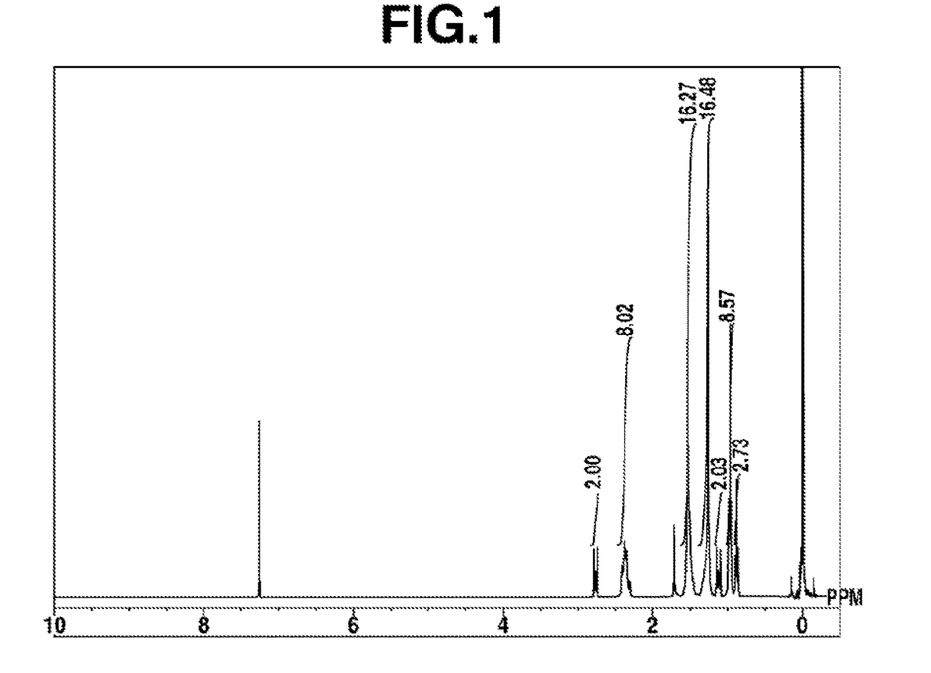
FIG. 1 is an $^1$H-NMR spectrum of compound 3 synthesized in Synthesis Example 1.

1.00 g of sodium 2-(trimethylsilyl)-1-ethanesulfonate was dissolved in 120 mL of deionized water. To this solution, a solution obtained by dissolving 2.28 g of tributyldodecylphosphonium bromide (manufactured by Tokyo Chemical Industry Co., Ltd.) in advance in 80 mL of deionized water was added, and the resulting mixture was stirred at room temperature overnight. At this time, the reaction solution became cloudy at first, and was separated into two layers after being allowed to stand overnight. To this reaction solution, 50 mL of ethyl acetate (manufactured by Wako Pure Chemical Industries, Ltd.) was added and an organic layer was extracted. This operation was repeated twice more, and all the organic layers thus obtained were washed twice with 50 ml, of deionized water. About 20 g of potassium carbonate (manufactured by Wako Pure Chemical Industries, Ltd.) was put into the organic layer and dried, a solid was filtered off, and then a solvent was distilled off to obtain target compound 3 as a colorless transparent liquid (amount of product 2.12 g, yield 77%). Note that sodium 2-(trimethylsilyl)-1-ethanesulfonate was synthesized according to a method described in U.S. Pat. No. 3,141,898. An $^1$H-NMR spectrum (solvent: deuterated chloroform) of compound 3 is illustrated in FIG. 1.

Synthesis Example 2

Synthesis of Compound 4

[Chem. 10]

Compound 4

Figure 2:
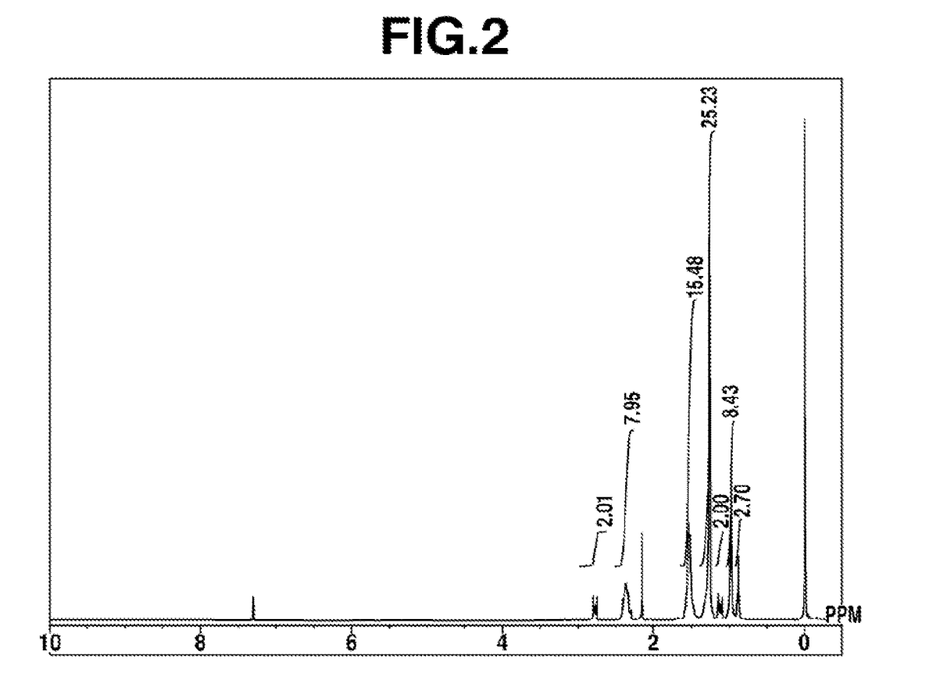
FIG. 2 is an $^1$H-NMR spectrum of compound 4 synthesized in Synthesis Example 2.

Compound 4 was obtained as a colorless transparent liquid in the same manner as in Synthesis Example 1 except that tributylhexadecylphosphonium bromide (manufactured by Tokyo Chemical Industry Co., Ltd.) was used in place of tributyldodecylphosphonium bromide (amount of product 1.68 g, yield 62%). An $^1$H-NMR spectrum (solvent: deuterated chloroform) of compound 4 is illustrated in FIG. 2.

Synthesis Example 3

Synthesis of Compound 7

[Chem. 11]

Compound 7

A 15 mL aqueous solution of 3.0 g ethyl methyl imidazolium chloride (manufactured by Tokyo Chemical Industry Co., Ltd) was added to 40 (volume in a state including deionized water, the same hereinafter) of an anion exchange resin (DS-2, manufactured by Organo Corporation) which had been washed with deionized water, and the resulting mixture was allowed to stand for several hours. DS-2 was filtered off, and then the resulting filtrate was added to 40 mL of newly prepared DS-2 which had been washed. The resulting mixture was allowed to stand for several hours, and then DS-2 was filtered off. Subsequently, the resulting filtrate was caused to pass through a column packed with 150 ml of DS-2 (eluent: deionized water), and the filtrate in a range showing alkalinity was collected to obtain an ethyl methyl imidazolium hydroxide aqueous solution in which a chloride had been completely replaced with a hydroxide.

A 65 mL aqueous solution of 4.0 g sodium 3-(trimethylsilyl)-1-propanesulfonate (manufactured by Tokyo Chemical Industry Co., Ltd., hereinafter, abbreviated as DSSNa) was added to 25 mL (volume in a state including deionized water, the same hereinafter) of a cation exchange resin (Amberlyst 15JS-HG•DRY, manufactured by Organo Corporation) which had been washed with deionized water, and the resulting mixture was allowed to stand for several hours. 15J5-HG-DRY was filtered off, and then the resulting filtrate was added to 25 mL of newly prepared 1515-HG-DRY which had been washed. The resulting mixture was allowed to stand for several hours, and then 15JS-HG•DRY was filtered off. Subsequently, the resulting filtrate was caused to pass through a column packed with 100 mL, of 15JS-HG•DRY (eluent: deionized water), and the filtrate in a range showing acidity was collected to obtain a 3-(trimethylsilyl)-1-propanesulfonic acid aqueous solution.

Figure 3:
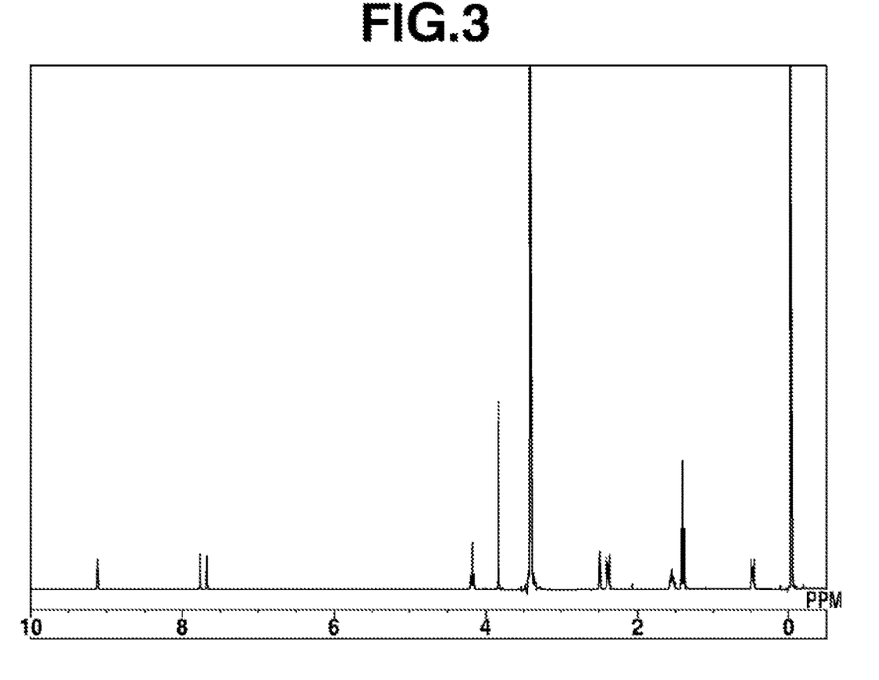
FIG. 3 is an $^1$H-NMR spectrum of compound 7 synthesized in Synthesis Example 3.

The resulting ethylmethylimidazolium hydroxide aqueous solution and 3-(trimethylsilyl)-1-propanesulfonic acid aqueous solution were mixed, the pH was adjusted to 6 to 8, water was removed from the mixed solution using an evaporator initially and using a vacuum pump thereafter to obtain compound 7 as a white solid (amount of product 5.3 g, yield 92%: based on DSSNa). An $^1$H-NMR spectrum (solvent: deuterated dimethyl sulfoxide) of the obtained compound 7 is illustrated in FIG. 3.

In addition, the structures of compounds 1, 2, 5, 6, and 8 used in the following Examples are as follows.

Incidentally, compounds 1 and 2 were synthesized according to Examples 1 and 2 of JP-A 2013-014536, respectively, Compounds 5 and 6 were synthesized according to Examples 1 and 2 of JP-A 2014-080388, respectively, and Compound 8 was synthesized according to Synthesis Example 3 of JP-A 2007-161733.

[Chem. 12]

[2] Preparation of Electrolyte Solution.

Example 1

Compound 8 was dissolved, in propylene carbonate (manufactured by Kishida Chemical Co., Ltd.) to prepare a 1 M solution. Compound 1 was added to this solution so as to have a concentration of 1% by weight to prepare an electrolyte solution.

Examples 2 to 6

An electrolyte solution was prepared in a similar manner to that in Example 1 except that each of compounds 2 to 6 was used in place of compound 1.

Figure 4:
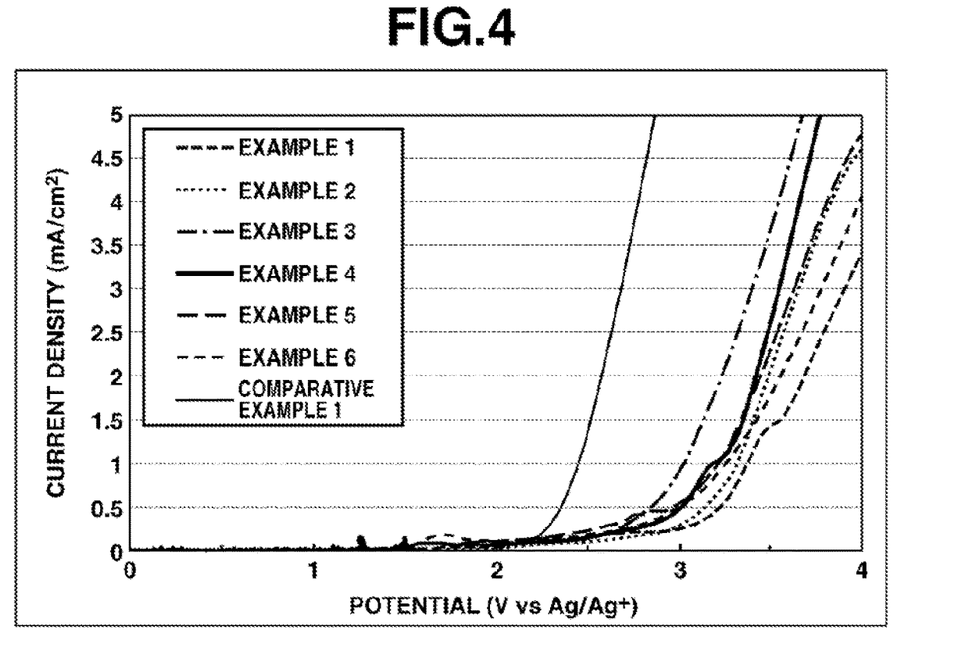
FIG. 4 is a graph illustrating cyclic voltammetry measurement results (oxidation side) in Examples 1 to 6 and Comparative Example 1.

The above-described electrolyte solutions prepared in Examples 1 to 6 and a 1 M propylene carbonate solution of compound 8 (Comparative Example 1) were subjected to cyclic voltammetry measurement. Measurement results on an oxidation side are illustrated in FIG. 4.

Example 7

Ethyl methyl imidazolium tetrafluoroborate (manufactured by Kishida Chemical Co., Ltd., hereinafter, abbreviated as EMIBF4) was dissolved in propylene carbonate to prepare a 1 M solution, and compound 7 was added to this solution so as to have a concentration of 5% by weight to prepare an electrolyte solution.

Example 8

An electrolyte solution was prepared in a similar manner to that in Example 7 except that compound 1 was used in place of compound 7.

Figure 5:
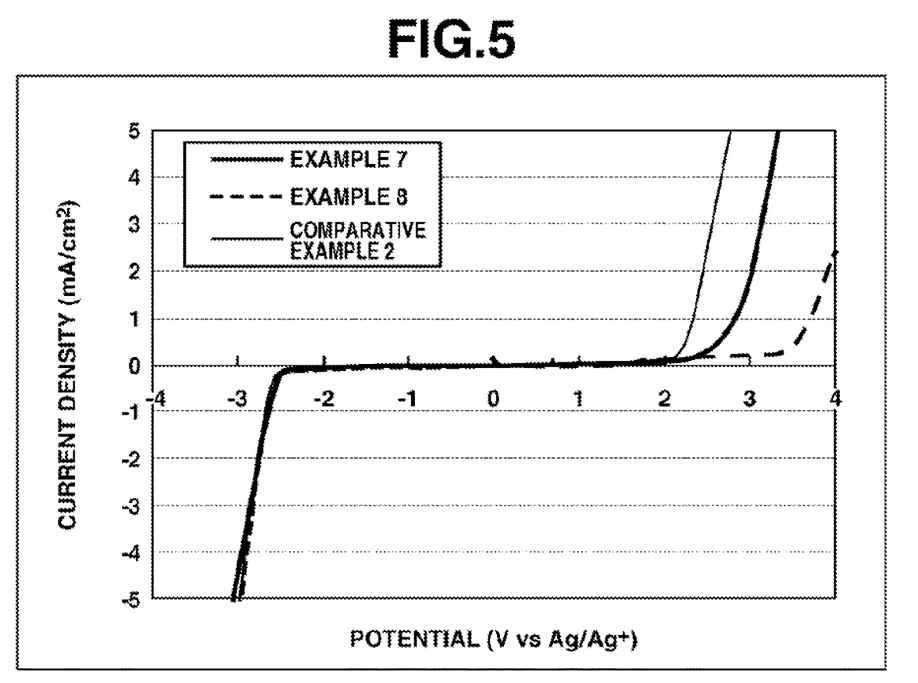
FIG. 5 is a graph illustrating cyclic voltammetry measurement results in Examples 7 and 8 and Comparative Example 2.

The above-described electrolyte solutions prepared in Examples 7 and 8 and a 1 M propylene carbonate solution of EMIBF4 (Comparative Example 2) were subjected to cyclic voltammetry measurement. Measurement results are illustrated in FIG. 5.

Example 9

Compound 8 was dissolved in methanol (manufactured by KANTO CHEMICAL. Co., Inc) to prepare a 1 M solution. DSSNa was added to this solution so as to have a concentration of 5% by weight to prepare an electrolyte solution.

Figure 6:
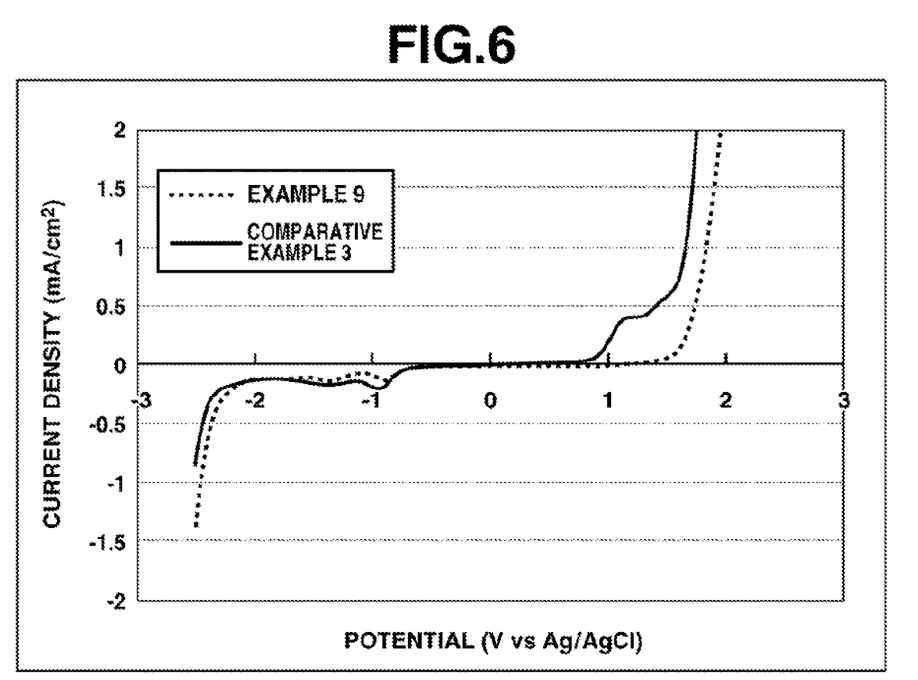
FIG. 6 is a graph illustrating cyclic voltammetry measurement results in Example 9 and Comparative Example 3.

The above-described electrolyte solution prepared in Example 9 and a 1 M methanol solution of Compound 8 (Comparative Example 3) were subjected to cyclic voltammetry measurement. Measurement results are illustrated in FIG. 6.

Example 10

Compound 1 was added to an LBG electrolyte solution (1 M LiPF$_6$/EC:PC (1:1) v/v %, manufactured by Kishida Chemical Co., Ltd.) so as to have a concentration of 1% by weight to prepare an electrolyte solution.

Figure 7:
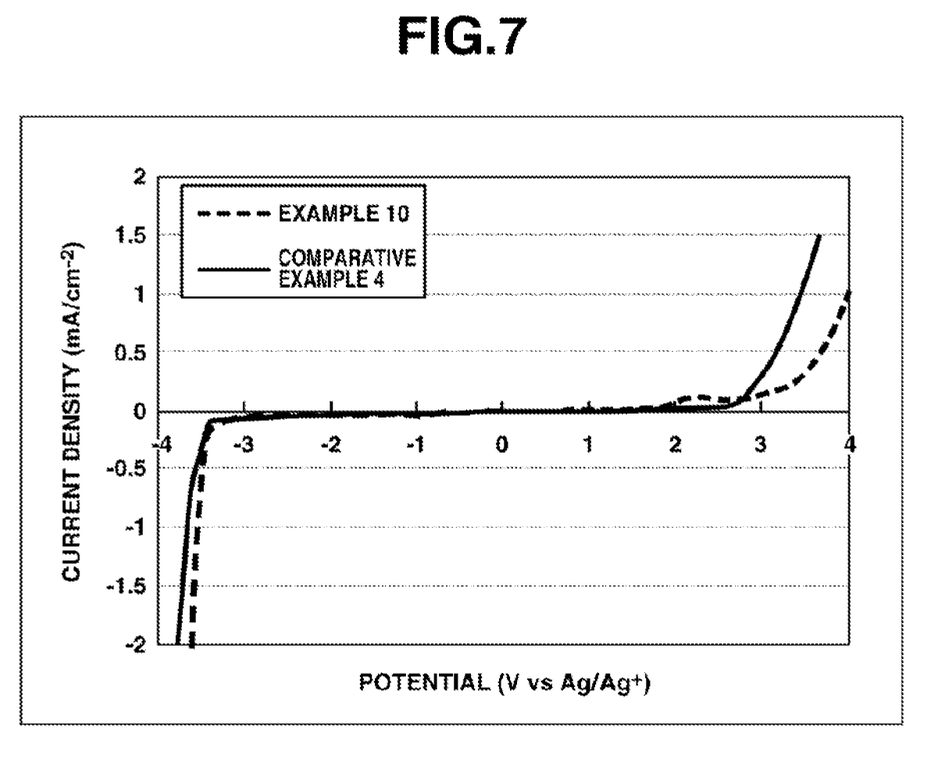
FIG. 7 is a graph illustrating cyclic voltammetry measurement results in Example 10 and Comparative Example 4.

The above-described electrolyte solution prepared in Example 10 and the LBG electrolyte solution (Comparative Example 4) were subjected to cyclic voltammetry measurement. Measurement results are illustrated in FIG. 7.

As illustrated in FIGS. 4 to 7, it is found that an electrolyte solution prepared by adding the additive for electrolyte solutions of the present invention has a withstand voltage improved as compared with an electrolyte solution to which the additive is not added.

[3] Manufacturing Electric Storage Device

[Example 11] Lithium Ion Capacitor (1) Manufacturing Positive Electrode Structure Activated carbon MaxSorve MSP20 (manufactured by Kansai Coke and Chemicals Company, Limited), a conductive agent (HS-100, manufactured by Denka Co., Ltd.), and a binder PVDF (manufactured by Aldrich Corporation, weight average molecular weight Mw: 534,000) were mixed in N-methyl-2-pyrrolidone (hereinafter, referred to as NMP) as a coating solvent so as to have a mass composition of 85:8:7 to prepare a positive electrode coating solution.

The obtained coating solution was applied to an etched aluminum foil (30CB, manufactured by Japan Capacitor Industrial Co., Ltd.) as a positive current collector. Thereafter, the resulting product was rolled with a roll press. Furthermore, NMP was dried and removed to form a positive electrode, thus obtaining a positive electrode structure.

(2) Manufacturing Negative Electrode Structure

Lithium titanate powder (lithium titanate spinel, manufactured by Sigma-Aldrich Corporation), a conductive agent (HS-100), and a binder PVDF (manufactured by Aldrich Corporation, weight average molecular weight Mw: 534,000) were mixed in NMP as a coating solvent so as to have a mass composition of 83:8:9 to prepare a negative electrode coating solution.

The obtained coating solution was applied to an etched aluminum foil (30CB) in a similar manner to the case of the positive electrode structure. Thereafter, the resulting product was rolled with a roll press. Furthermore, NMP was dried and removed to form a negative electrode, thus obtaining a negative electrode structure.

(3) Manufacturing Secondary Battery

An aluminum electrode takeout terminal was spot-welded to each of the positive electrode structure and the negative electrode structure obtained above. A cell was assembled via a separator (TF40-35, manufactured by Nippon Kodoshi Corporation), and was inserted into an outer container made of an aluminum laminate (manufactured by Dai Nippon Printing Co., Ltd.). A predetermined amount of the electrolyte solution prepared in Example 10 was injected thereinto. Thereafter, the electrolyte solution was allowed to stand at 25° C. under a reduced pressure of 10 kPa or less for 12 hours or more for impregnation with the electrolyte solution. Thereafter, the resulting product was sealed by thermal welding to obtain a secondary battery cell.

Comparative Example 5

Lithium Ion Capacitor

A secondary battery cell was manufactured in a similar manner to Example 11 except that an LBG electrolyte solution was used as an electrolyte solution as it was in place of the electrolyte solution prepared in Example 10.

Using the secondary battery cells obtained in Example 11 and Comparative Example 5, a charge/discharge test was performed at an environmental temperature of 70° C. After a voltage reached a charging upper limit voltage 2.8 V, the voltage was maintained for 1000 hours. Thereafter, each of the cells was discharged to 1.8 V, cell capacity and internal resistance at room temperature were measured, and the degree of cell deterioration was evaluated. Measurement results are illustrated in Table 1.

TABLE 1

| | Capacity retention ratio (%) | Resistance increase ratio (%) |
|---|---|---|
| Example 11 | 92 | 1.6 |
| Comparative Example 5 | 90 | 2.0 |

Example 12

Electric Double Layer Capacitor (1) Manufacturing, Positive Electrode Structure

Activated carbon MaxSorve MSP20 (manufactured by Kansai Coke and Chemicals Company, Limited), a conductive agent (HS-100, manufactured by Denka Co., Ltd.), and a binder PVDF (manufactured by Aldrich Corporation, weight average molecular weight Mw: 534,000) were mixed in NMP as a coating solvent so as to have a mass composition of 85:8:7 to prepare a positive polarizable electrode coating solution.

The obtained coating solution was applied to an etched aluminum foil (30CB, manufactured by Japan Capacitor Industrial Co., Ltd.) as a positive current collector. Thereafter, the resulting product was rolled with a roll press. Furthermore, NMP was dried and removed to form a positive polarizable electrode, thus obtaining a positive polarizable electrode structure.

(2) Manufacturing Negative Electrode Structure

Activated carbon (LPY039, manufactured by Japan EnviroChemicals, Limited), a conductive agent (HS-100, manufactured by Denka Co., Ltd.), and a binder PVDF (manufactured by Aldrich Corporation, weight average molecular weight Mw: 534,000) were mixed in NMP as a coating solvent so as to have a mass composition of 85:7:8 to prepare a negative polarizable electrode coating solution.

The obtained coating solution was applied to an etched aluminum foil (30CB, manufactured by Japan Capacitor Industrial Co., Ltd.) as a negative current collector. Thereafter, the resulting product was rolled with a roll press. Furthermore, NMP was dried and removed to form a negative polarizable electrode, thus obtaining a negative polarizable electrode structure.

(3) Manufacturing, Electric Double Layer Capacitor

An aluminium electrode takeout terminal was spot-welded to each of the positive polarizable electrode structure and the negative polarizable electrode structure obtained above. A cell was assembled via a separator (TF40-35, manufactured by Nippon Kodoshi Corporation), and was inserted into an outer container made of an aluminum laminate (manufactured by Dai Nippon Printing Co., Ltd.). A predetermined amount of the electrolyte solution prepared in Example 1 was injected thereinto. Thereafter, the electrolyte solution was allowed to stand at 25° C. under a reduced pressure of 10 kPa or less for 12 hours or more for impregnation with the electrolyte solution. Thereafter, the resulting product was sealed by thermal welding to obtain an electric double layer capacitor.

Comparative Example 6

Electric Double Layer Capacitor

An electric double layer capacitor cell was manufactured in a similar manner to Example 12 except that the 1 M propylene carbonate solution of compound 8 was used as an electrolyte solution in place of the electrolyte solution prepared in Example 1.

Using the electric double layer capacitor cells obtained in Example 12 and Comparative Example 6, a charge/discharge cycle test was performed at 70° C. In the charge/discharge cycle test, charge/discharge was continuously performed for 8 hours at a voltage of 2.25 V to 3.75 V at a current value of 200 A. After completion of the cycle test, cell capacity and internal resistance at room temperature were measured, and the degree of cell deterioration was evaluated. Measurement results are illustrated in Table 2.

TABLE 2

|  | Capacity retention ratio (%) | Resistance increase ratio (%) |
|---|---|---|
| Example 12 | 99 | 1.3 |
| Comparative Example 6 | 98 | 1.5 |

As illustrated in Tables 1 and 2, it is found that a device using an electrolyte solution to which the additive for electrolyte solutions of the present invention is added has a better capacity retention ratio, a lower resistance increase ratio, and a smaller degree of cell deterioration.

Example 13

Lithium Ion Battery (1) Manufacturing Positive Electrode

A positive electrode active material (LiCoO$_2$, manufactured by Honjo Chemical Co., Ltd.), a conductive agent (acetylene black, manufactured by Denka Co., Ltd.), and PVDF were adjusted so as to have a mass composition of 91:3:6 and were dissolved to obtain a solution. The resulting solution was mixed with NMP to prepare a paste-like positive electrode coating solution. This positive electrode coating solution was applied onto an aluminium foil with a doctor blade so as to have a dry film thickness of 115 μm. Thereafter, the resulting product was dried at 80° C. for 2 hours, and was rolled to form a LiCoO$_2$ positive electrode, thus obtaining a positive electrode structure.

(2) Manufacturing Secondary Battery

The positive electrode obtained above and a metallic lithium foil as a negative electrode were each cut into a size of 12φ. A polyolefin flat film (Hipore, manufactured by Asahi Kasei E-Materials Co., Ltd.) as a separator was sandwiched between the cut positive and negative electrodes. The electrolyte solution prepared in Example 10 was injected therein, and the positive and negative electrodes were impregnated with the electrolyte solution to manufacture a coin type lithium ion battery.

The lithium ion battery obtained above was subjected to a charge/discharge test at an upper limit voltage of 4.2 V during charge and an end voltage of 3 V during discharge. Discharge capacity per unit volume of an electrode was about 140 mAh/cm$^3$.

Example 14

Air Battery (1) Manufacturing Positive Electrode

A positive electrode active material (MCMB, manufactured by Osaka Gas Chemicals Co., Ltd.) and PVDF were adjusted so as to have a mass composition of 88:12, and an appropriate amount of NMP was mixed therewith to prepare a paste-like positive electrode coating solution. This positive electrode coating solution was applied onto an aluminum foil with a doctor blade so as to have a dry film thickness of 75 μm. Thereafter, the resulting product was dried at 140° C. for 72 hours to remove NMP and moisture. The resulting product was cut and rolled, and then a current collector was peeled off therefrom. The obtained positive electrode was pressure-bonded to stainless steel SUS304 60 mesh (manufactured by Nilaco Corporation). The resulting product was vacuum-dried at 120° C. for 24 hours to obtain a positive electrode structure.

(2) Manufacturing Air Battery

The positive electrode structure obtained above and a metallic lithium foil as a negative electrode were cut into sizes of 15φ and 13φ, respectively. A polyolefin flat film (Hipore manufactured by Asahi Kasei E-Materials Co., Ltd.) as a separator was impregnated with the electrolyte solution prepared in Example 10, and was sandwiched between the positive and negative electrodes previously cut to manufacture a lithium air battery cell. This cell was placed in a positive electrode can with an air hole formed such that a positive electrode current collector faced the air hole, and then was covered with a negative electrode can. These cans were sealed to manufacture an air battery. The obtained cell was put in a glass desiccator (500 mL) equipped with a gas replacement cock. Oxygen can be introduced into the glass desiccator, and oxygen can be supplied to the positive electrode.

The air battery obtained above was put in a glass desiccator, was allowed to stand in a thermostatic chamber at 25° C. for about 3 hours, and then was subjected to a charge/discharge test. Charge/discharge was performed at a charge voltage of 4.6 V, a discharge end voltage of 2 V, and a current value of 0.02 mA. The obtained discharge capacity was 8.4 mAh. Even after a similar charge/discharge cycle was repeated 10 times or more, discharge capacity was almost equal thereto.

The invention claimed is:

1. An additive for electrolyte solutions, comprising a compound constituted by a silicon-containing sulfonate anion represented by formula (1) and a monovalent cation:

(1)

wherein Rs each independently represent an alkyl group having 1 to 8 carbon atoms, and n represents an integer of 2 to 6, and wherein the monovalent cation is selected from the group consisting of an alkali metal ion, and an imidazolium ion.

2. The additive for electrolyte solutions according to claim 1, wherein all the Rs are methyl groups.

3. The additive for electrolyte solutions according to claim 1, wherein the alkali metal ion is a sodium ion.

4. The additive for electrolyte solutions according to claim 1, wherein the imidazolium ion is represented by formula (3):

(3)

wherein $R^3$ and $R^4$ each independently represent an alkyl group having 1 to 8 carbon atoms.

5. An electrolyte solution comprising: an additive; an organic solvent; and an electrolyte salt,
wherein the additive comprises a compound constituted by a silicon-containing sulfonate anion represented by formula (1) and a monovalent cation:

(1)

wherein Rs each independently represent an alkyl group having 1 to 8 carbon atoms, and n represents an integer of 2 to 6, and
wherein the monovalent cation is selected from the group consisting of an alkali metal ion, an imidazolium ion, and a quaternary phosphonium ion.

6. The electrolyte solution according to claim 5, wherein the organic solvent is a carbonates solvent.

7. The electrolyte solution according to claim 6, wherein the carbonates solvent is a mixed solvent.

8. An electric storage device constituted by using the electrolyte solution according to claim 5.

9. The electric storage device according to claim 8, which is a secondary battery or an electric double layer capacitor.

10. An electric storage device constituted by using an additive for electrolyte solutions, the additive comprising: a compound constituted by a silicon-containing sulfonate anion represented by formula (1) and a monovalent cation:

(1)

wherein Rs each independently represent an alkyl group having 1 to 8 carbon atoms, and n represents an integer of 2 to 6, and
wherein the monovalent cation is selected from the group consisting of an alkali metal ion, an imidazolium ion, and a quaternary phosphonium ion.

11. A method, comprising adding an additive to an electrolyte solution containing a solvent and an electrolyte salt to improve a withstand voltage of the electrolyte solution,
wherein the additive comprises a compound constituted by a silicon-containing sulfonate anion represented by formula (1) and a monovalent cation:

(1)

wherein Rs each independently represent an alkyl group having 1 to 8 carbon atoms, and n represents an integer of 2 to 6, and
wherein the monovalent cation is selected from the group consisting of an alkali metal ion, an imidazolium ion, and a quaternary phosphonium ion.

* * * * *